March 18, 1941.  T. W. CARRAWAY  2,235,607
AIR CONDITIONING APPARATUS
Filed Aug. 25, 1938  6 Sheets-Sheet 2

Inventor
Thomas W. Carraway
By Baldwin & Wight
Attorneys

March 18, 1941.   T. W. CARRAWAY   2,235,607
AIR CONDITIONING APPARATUS
Filed Aug. 25, 1938   6 Sheets-Sheet 3

Inventor
Thomas W. Carraway
By Baldwin y Wight
his Attorneys

March 18, 1941. T. W. CARRAWAY 2,235,607
AIR CONDITIONING APPARATUS
Filed Aug. 25, 1938 6 Sheets-Sheet 4

Inventor
Thomas W. Carraway
By Baldwin & Wight
his Attorneys

March 18, 1941. T. W. CARRAWAY 2,235,607
AIR CONDITIONING APPARATUS
Filed Aug. 25, 1938 6 Sheets-Sheet 6

Inventor
Thomas W. Carraway
By Baldwin & Wight
his Attorneys

Patented Mar. 18, 1941

2,235,607

UNITED STATES PATENT OFFICE 2,235,607

AIR CONDITIONING APPARATUS

Thomas W. Carraway, Dallas, Tex.

Application August 25, 1938, Serial No. 226,808

20 Claims. (Cl. 62—6)

The invention relates generally to air conditioning systems and apparatus and primarily seeks to provide a novel air conditioning system and apparatus highly efficient in the provision of desired healthful, effective temperatures, and so simple and economical in initial cost and maintenance as to be adaptable to practical use by small home owners and business houses.

Conventional types of air conditioning systems usually are designed to deliver air at a particular temperature, usually too low, and frequently detrimental to the health of persons exposed to the temperature for long periods of time. This has been proven many times by the stifling feeling, and even nausea experienced by persons leaving such low temperature conditioned areas and becoming exposed to high temperature or direct rays of the sun outside said areas. This results from the fact that in most mechanically cooled air conditioning systems the dry bulb temperature may be held relatively constant with a thermostat and the humidity controlled only when the moisture content reaches an extreme condition and partially controlled when the moisture content in the atmosphere varies, resulting in an effective temperature too low for producing a healthful condition even though it may be comfortable.

It is also well known that many conventional forms of air conditioning systems are limited with respect to the volume of properly conditioned air which they can produce, whereas it is highly desirable to produce the greatest volume of properly conditioned air practically and economically possible of production for the purpose of removing smoke, body odors and the like and providing the most sanitary and healthful conditions possible of attainment.

Therefore, the present invention includes among its objects, that of providing a novel air conditioning system and apparatus operating primarily on the evaporative cooler principle and capable of producing healthful effective temperatures in the conditioned areas by provision of a greater than usual volume of the conditioned air, which system and apparatus is so economically manufactured and operated that the healthful effective temperatures produced thereby can be enjoyed even in small homes and by infants and aged persons of low vitality to be found therein.

Another object of the invention is to provide a novel air conditioning unit operating on the evaporative cooler principle, and a novel combination therewith of an auxiliary air cooling equipment for supplementing the effect of the main unit when lower temperatures than are attainable by use of the main unit are desirable, including means for automatically controlling the apparatus so as to employ or cut out auxiliary equipment according to the demands of use.

Another object of the invention is to provide an auxiliary equipment of the nature stated in which melting ice is employed for the purpose of lowering the temperature of and extracting latent heat from the air conditioned in the main unit, and in which the cold water resulting from the melting of the ice is utilized in the main unit for indirectly effecting a cooling of air therein.

Another object of the invention is to provide an air conditioning unit operating on the evaporative cooler principle in which the air ducts are constructed and arranged in a novel compact manner providing for freer and more effective flow of the counterflow streams of conditioning air and air being conditioned, and in which the air moving fans are disposed in a novel and compact manner for conserving space and avoiding the provision of flow obstructing headers.

Another object of the invention is to provide a novel unit of the evaporative cooler type mentioned in which provision is made for adapting the unit to use throughout all seasons of the year.

With the above and other objects in view which will more fully appear, the nature of the invention will be more clearly understood by following the description, the appended claims, and the several views illustrated in the accompanying drawings.

In the drawings:

Figure 3 is a horizontal section taken on the line 3—3 on Figure 1.

Figure 14 is a detail vertical longitudinal section illustrating an auxiliary unit of the type shown in Figure 10 but which employs a small mechanical refrigerating equipment in lieu of the melting ice.

Figure 15 is a central horizontal section, and Figure 16 a central vertical cross section, of the unit shown in Figure 14.

Figure 17 is a wiring diagram illustrating how the apparatus of Figures 14 to 16 can be controlled.

The improved air conditioning unit disclosed in detail in Figures 1 to 5 of the drawings operates on the evaporative cooler principle and includes an elongated rectangular housing or casing 5 of suitable construction, open at one end and filter equipped as at 6, and open at its other end and filter equipped as at 7. Air from outside the building, together with a suitable proportion of air recirculated from the compartment or compartments to be conditioned enters through the filter 6, and air from outside the building and intended to serve as an evaporative cooling agent, in a manner later to be described, enters the casing from the filter 7.

An end header 8 extends the full depth of the casing immediately behind the filter 6 and includes a vertical and centrally disposed stream divider 9. The header 8 communicates at the sides with side headers 10 which extend part way along the casing as indicated at Figures 1 and 2 of the drawings.

Figure 4:
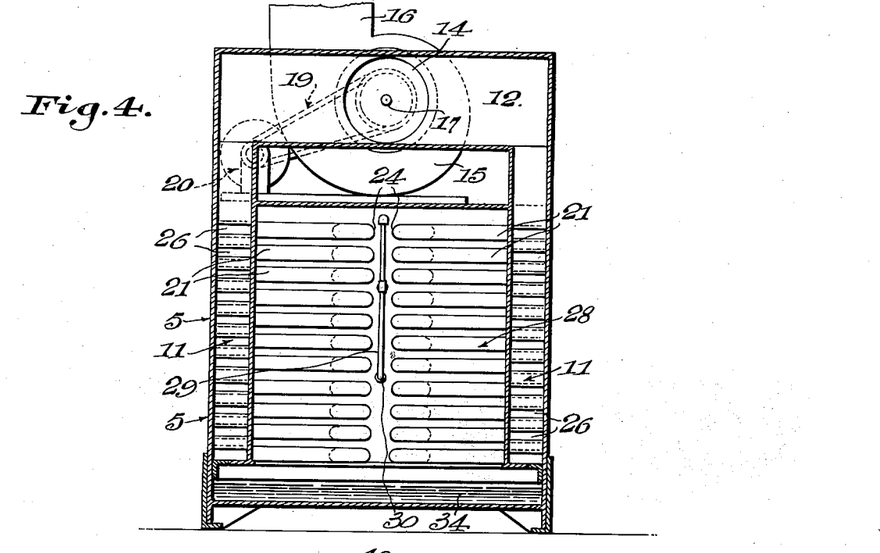
Figures 4 and 5 are vertical cross sections taken respectively on the lines 4—4 and 5—5 on Figure 1.
Figure 5:
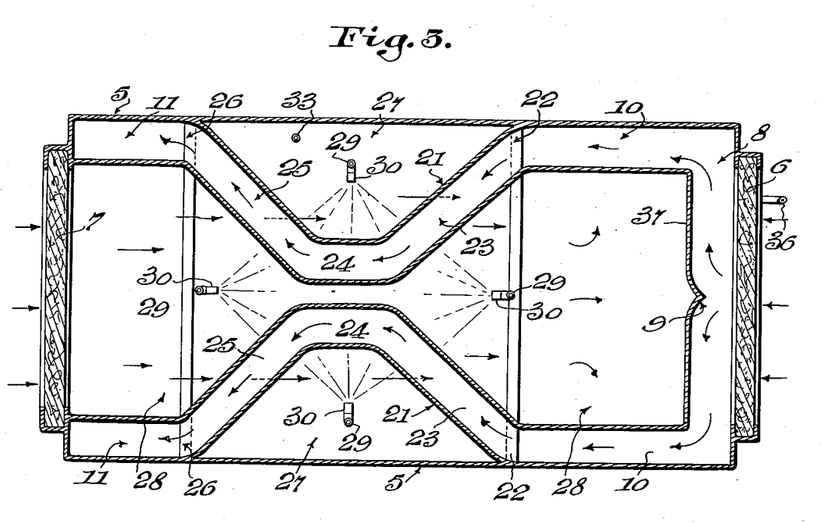

At the other end of the casing a full depth header 11 is positioned at each side, and these headers extend above the casing as indicated in Figure 4 of the drawings and are connected by a cross header 12. The cross header 12 includes a vertically and centrally disposed diverting rib 13 by which opposed streams of air entering the header 12 from the headers 11 are diverted into the center duct portion 14 which connects with the center intake of a fan or blower disposed transversely atop the casing 5 and generally designated 15. The outlet or discharge throat 16 of the fan is upwardly directed and is intended to be connected by suitable ducts with the compartment or compartments to be conditioned.

Figure 1:
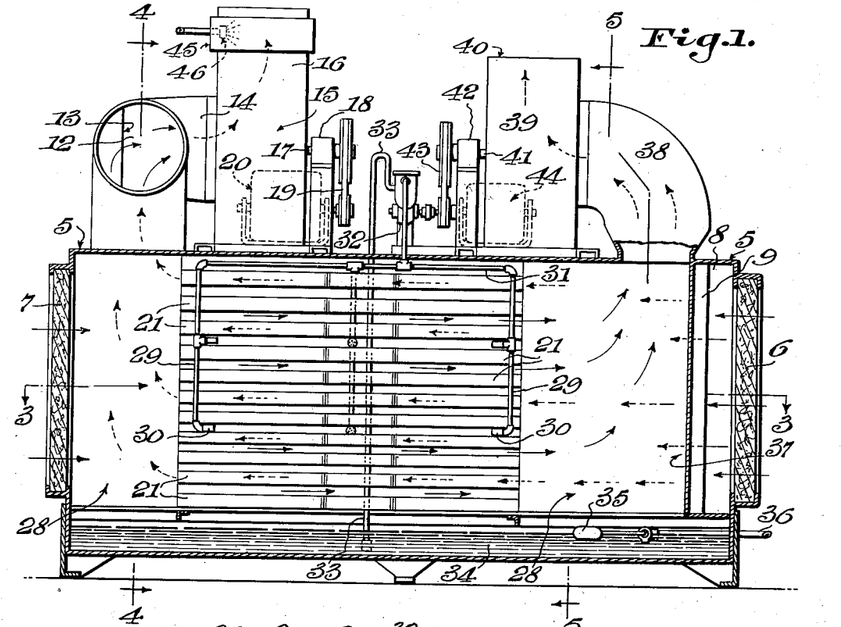
Figure 1 is a side elevation illustrating the evaporative cooler unit, the lower portion thereof being shown in central, vertical longitudinal section.
Figure 2:
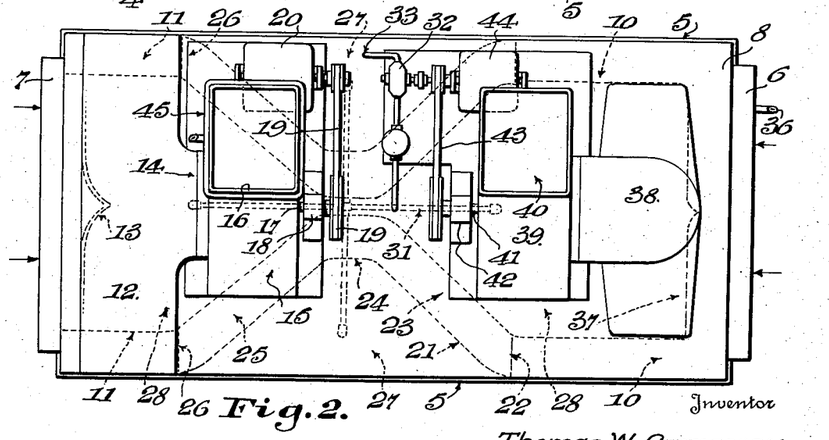
Figure 2 is a plan view.

The fan or blower equipment 15 includes a drive shaft 17 rotatable in a single bearing 18 and driven by suitable belt and pulley transmission 19 from a motor 20 supported upon the top of the casing as illustrated in Figures 1, 2 and 4 of the drawings.

The side headers 10 and 11 spaced laterally at the respective ends of the casing 5 communicate through horizontally disposed, vertically spaced, relatively flat heat exchange ducts 21. The ducts are shaped to present a maximum of heat exchange surface area without unduly obstructing passage of air thereover for evaporative cooling purposes, and for this purpose are arranged in two vertical batteries each including an entrance portion 22, an angularly and inwardly directed cross-over portion 23, a longitudinal portion 24 disposed adjacent the center line of the casing and parallel a similar portion of the opposed battery of ducts, another reversely directed or angularly and outwardly disposed crossover portion 25, and a delivery portion 26. This arrangement of ducts, best shown in Figure 2 of the drawings, also serves to provide two hollow chambers 27 disposed vertically at the sides of the casing and two hollow chambers 28 disposed vertically and centrally at the ends of the casing. In each of the chambers 27 and 28 is vertically disposed a water pipe 29 equipped with a plurality of atomizer nozzles or spray heads 30. The pipes 29 are supplied with water through delivery pipe lines 31 from a pump 32 supported upon the casing top and which may be driven by a separate motor or by a fan or blower driving motor later to be described. The pump receives the water through a suction line 33 from a sump 34 provided at the bottom of the casing and in which a constant level supply of water is maintained by float control 35 and the service water supply outlet 36.

It will be understood that air entering the casing through the filter 6 will be drawn through the headers 8 and 10, ducts 21 and headers 11 and 12 by the fan or blower equipment 15, the movement of the air being generally from right to left as viewed in Figures 1 and 2 of the drawings.

By employment of the atomizer nozzles 30, the water delivered into the casing is thoroughly atomized, spread out and diffused so as to thoroughly wet all external surfaces of the ducts 21 with a very thin film of water, the film being so thin as to very rapidly evaporate and have no appreciable insulating effect on the ducts. Arranged and wetted as herein described, the ducts comprise very efficient heat exchanging media, and when an air stream is passed over the external surfaces of the wetted ducts in a counter-current direction, that is, in a direction opposite that in which the air to be conditioned flows internally of the ducts, rapid extraction of heat from the air passing along within the ducts is effected by rapid evaporation of the water of the film coating the external surfaces of the ducts.

Immediately behind the header 8, and between the communicating headers 10, is mounted a counterflow air collector 37 which collects air after it has passed through the casing and between the ducts 21 and directs it upwardly into a center duct 38 which delivers into the center intake of a fan or blower equipment 39 disposed transversely of and on top of the casing 5 with its outlet 40 directed upwardly and adapted for connection with the outside of the building in which the casing is mounted. The fan equipment includes a driver shaft 41 rotatable in a single bearing 42 and driven by suitable belt and pulley 43 from a motor 44 likewise mounted atop the casing and which may also be employed to drive the pump 32 hereinbefore referred to.

It has been found in practice that the motor which drives the fan equipment alone can be a ¼ H. P. motor, and the motor which drives the fan and also the pump equipment can be a ⅓ H. P. motor. As previously stated, however, an individual drive for the pump may be employed if desired.

When the conditioning unit disclosed in detail in Figures 1 to 5 of the drawings is to be employed for all season use, any suitable conventional form of heater unit generally designated 45 may be mounted at or above the fan equipment outlet 16, and a conventional form of electric valve control humidifying spray 46 is used in combination with such a heater unit so as to provide for suitable heating and humidifying of the air before it is delivered into the compartment or compartments to be conditioned.

Figure 6:
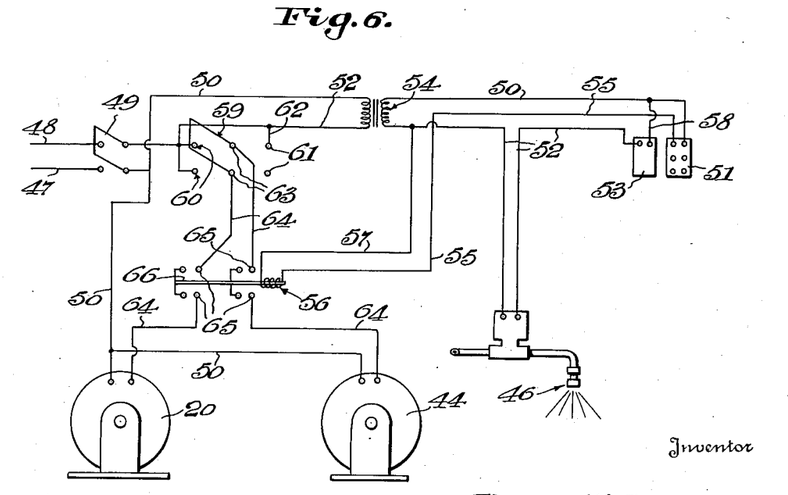
Figure 6 is a wiring diagram illustrating how the apparatus of Figures 1 through 5 can be controlled.

In Figure 6 of the drawings there is illustrated a wiring diagram illustrating one manner of controlling the equipment hereinbefore described, and in this diagram power input lines are indicated at 47 and 48, said lines being controlled by a master hand switch 49. The line 47 is connected by lines 50 with one side of each of the motors 20 and 44, and with one side of the effective temperature thermostat 51. The other line 48 is connected by lines 52 with one side of a humidity control or hygrostat 53 through the electric valve control of the spray 46, a suitable transformer 54 being connected in the lines 50 and 52. The other side of the thermostat 51 is connected by a line 55 with a relay 56 also connected by a line 57 with the line 52. The hygrostat 53 is also connected by a line 58 with the line 50. A double pole, double throw season switch 59 is provided and is engageable at one side (for summer set-up) with spaced contacts 60 connected with the lines 48 and 52, and at the other side with spaced contacts 61 (for winter set-up), one of which is open and the other of which is connected at 62 with the lines 52. The center poles 63 are connected by lines 64 with the other sides of the motors 20 and 44, said lines 64 including spaced contacts 65 across which circuits are completed or broken by the switch 66 actuated by the relay 56.

By reason of the provision of the effective temperature thermostat control 51 a healthy conditioning effect is provided in terms of constant comfort and body sensitive conditions of warmth or cold instead of providing constant dry bulb temperatures regardless of humidity variations and which frequently result in the provision of unhealthy low temperatures as hereinbefore outlined.

Provision of the air filter 6 assures the delivery of clean air to the areas to be conditioned, and by reason of the provision of the filter 7 the counterflow evaporative cooling media air is cleansed and uniformly distributed in a manner for providing the most efficient bathing of the external surfaces of the ducts and for keeping said surfaces free of collection of solids which would tend to insulate and reduce the heat transfer efficiency of the ducts.

In operation, recirculated and make-up air entering the unit through the filter 6 passes through the headers 8 and 10 and the ducts 21 into the headers 11 and 12, heat being extracted from the air by heat exchange through the walls of the ducts due to evaporative cooling effect. Rapid evaporation of the thin films of water on the external surfaces of the ducts is brought about by the constantly changing counterflow current of air drawn into the casing through the filter 7 and bathing the wet external surfaces of the ducts. As previously stated the evaporative cooling media air passes out of the unit through the discharge 40 of the fan equipment 39, and air to be directed to the compartment or compartments to be cooled is delivered from the outlet 16 of the fan equipment 15.

When the season switch 59 is positioned to the left as viewed in Figure 6, both motors 20 and 44 are connected in the circuits and the apparatus is set for summer use. Whenever cool air is demanded by the effective temperature thermostat 51, the relay 56 will be energized and the switch 66 actuated to close the lines 64 across the contacts 65 for completing the motor circuits and setting both motors 20 and 44 into operation. With both motors operating both air streams are set into motion and the pump delivers spray water to the atomizing spray heads 30. This operation of the parts will pertain until the demand for cooling air ceases, when the control unit 51 will function to de-energize the relay 56 and break the motor circuits across the contacts 64. The humidifying spray 46, the heating unit 45, and the hygrostat or humidity control 53, function only in the winter time. In the winter time the season switch 59 is thrown over to the right, connecting the line 62 and its contact 61 in circuit with the motor 20 alone so that the air is merely circulated and heated and humidified as may be necessary. Obviously the evaporative cooling effect of the countercurrent air and water sprays is not desirable and these equipments are not utilized during the winter.

The apparatus hereinbefore described has been found to be very efficient in the cooling of air by employment of the evaporative cooling principle, and without the air of artificial refrigeration. In one test, during which the dry bulb temperature of outside air was 105°, and the wet bulb temperature 75°, the air, in passing through the apparatus, was sensibly cooled by employment of the evaporative cooling principle to a temperature of 80°. Assuming a rise in temperature of the air in the conditioned space of 5°, the air in the conditioned space would have a dry bulb temperature of 85° and a wet bulb temperature of 69.4° with a total heat content of only 33.5 B. t. u.

In this test 6.3 B. t. u.'s per pound of air were extracted amounting to the removal of 54,000 B. t. u.'s per hour at 2,000 C. F. M., which is equivalent to 4½ tons of mechanical refrigeration or the melting of 375 lbs. of ice per hour. Indirect evaporative cooling of outside air to a dry bulb temperature of 80° and a subsequent heating of the air in the cooled compartment to a temperature of 85° at 46% relative humidity and an average air velocity of 200' per minute results in an effective temperature of 75° in said conditioned area.

Figure 7:
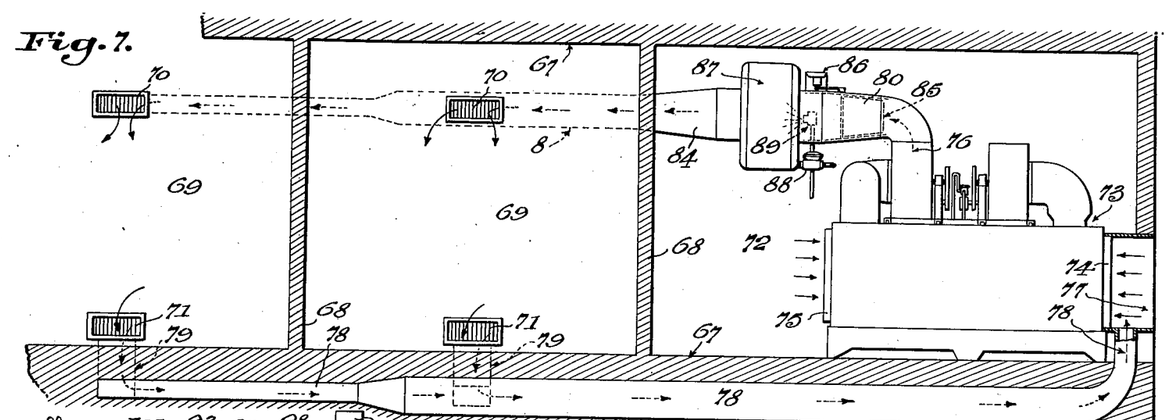
Figure 7 is a somewhat diagrammatic side elevation and part longitudinal section illustrating an installation of the improved apparatus for use throughout the year.
Figures 8, 9:
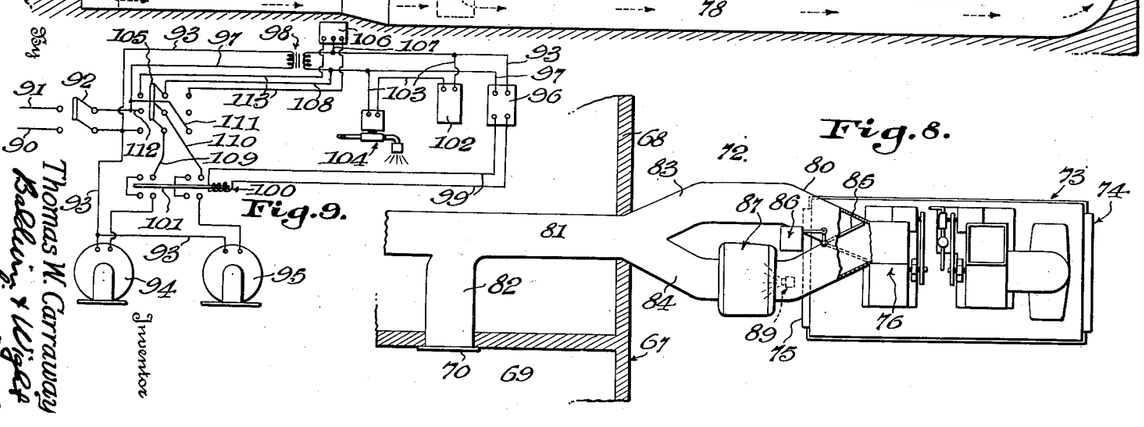
Figure 8 is a somewhat diagrammatic plan view illustrating the arrangement shown in Figure 7.
Figure 9 is a wiring diagram illustrating how the apparatus of Figures 7 and 8 can be controlled.

In Figures 7 to 9 of the drawings, a modified form of the invention is illustrated, the apparatus shown in these figures being adapted for all season use. In these figures the building in which the compartment or compartments to be conditioned are formed is diagrammatically indicated at 67, it being divided by walls 68 into compartments 69. In each compartment there is provided a grille covered conditioned air inlet 70, disposed at a high point, and a grille covered used air outlet 71 positioned at a low point. Within a suitable receiving room 72 is positioned the air conditioning unit generally designated 73 and which is identical in construction with the unit disclosed in detail in Figures 1 to 5 of the drawings except for the heat unit feature thereof.

This unit includes a filter protected inlet 74 through which the air to be conditioned enters the unit, and a filter protected inlet 75 through which the countercurrent air for evaporative cooling purposes is admitted. In this unit the conditioned air delivery throat 76 does not deliver directly into a heating unit as previously described but delivers into an air heating or bypassing equipment later to be described.

Air to be conditioned enters the building at 77 from outside and together with recirculated or return air enters the conditioning unit through the filter protected inlet 74. The recirculated air is delivered by a return duct 78 connected by short ducts 79 with the respective compartment outlets 71. During summer operations for example, about 60% of cool air from the conditioned area is recirculated and about 40% of make-up air is introduced from the outside.

The delivery duct or outlet 76 delivers into a Y 80 leading toward the compartments to be air conditioned through a main duct 81 connected by short ducts 82 with the individual compartment inlets 70.

One leg of the Y connects with a by-pass 83 around the heater duct 84 into which the other leg of the Y delivers. A valve 85 is disposed at the juncture of the Y and is movable under control of control box mechanism generally designated 86 so as to render the legs of the Y selectively effective, or, in other words, to permit passage of the air through a selected leg to the exclusion of the leg not selected. A heater unit 87 of any conventional form is mounted in the heater duct 84 and includes a supply control generally designated 88. An electric valve control humidifying spray 89 is mounted in the leg of the Y adjacent the heater unit and is automatically controlled to humidify air passing through said leg as might be demanded by conditions in the compartments 69.

In Figure 9 of the drawings I have illustrated diagrammatically a system of control for the equipment disclosed in detail in Figures 7 and 8. In this diagram, 90 and 91 indicate the power input lines, and 92 the master hand switch by which the power input may be controlled. The power line 90 is connected by lines 93 with one side of both motors diagrammatically illustrated at 94 and 95 and with one side of an effective temperature thermostat 96. The other line 91 is connected by lines 97 with the other side of the thermostat 96, a suitable transformer 98 being connected in the lines 93 and 97. The thermostat 96 also is connected by lines 99 with a relay 100 which controls the position of a switch 101. A hygrostat or humidity control unit 102 is provided and is connected by lines 103 with the lines 93 and 97, and with the electric valve controlled humidifying spray equipment 104. A triple pole, double throw season switch 105 is provided. A control unit 106 is provided for actuating the valve 85 at the Y juncture and is connected by a line 107 with the line 93. One center contact of the switch 105 is connected by a line 108 with the line 97, the other two center contacts being connected by lines 109 and 110 with the other sides of the motors designated 94 and 95, circuit through the lines 109 and 110 being made or broken through actuation of the switch 101 previously referred to. Two other selective contacts cooperate with the line 109 and the motor 94 and both are connected at 111 with the line 97. Two other selective contacts cooperate with the line 110 and the motor 95 and one thereof connects at 112 with a line 97, the other being open so that the motor 95 will not be actuated in the winter time, or when the switch 105 is thrown to the right as viewed in Figure 9.

Two other selective contacts are connected by selective lines 113 with the valve control unit 106.

With the equipment shown in Figures 7 and 8, controlled as diagrammatically illustrated in Figure 9, the apparatus will operate in the summer time in the same manner as the unit disclosed in Figures 1 through 5, and the heating equipment will not function. With the season switch 105 thrown to the left as viewed in Figure 9 both motors 94 and 95 will be connected to the circuits so that whenever the effective temperature thermostat 96 demands cooling the relay 100 will be energized, the switch 101 moved to complete circuits through the lines 109 and 110 and both motors will be set into operation to cause the blowers to respectively provide the counterflow air which cooperates with the atomizer sprays and to feed the cooled air to the compartments to be cooled and likewise cause the spray heads to function. The valve control unit 106 will be actuated to position the valve for closing off the Y leg leading to the heating unit so that the cooled air will be directed through the by-pass 83. As soon as the demand for cooling in the compartments is supplied, the thermostat 96 will again break the circuit and discontinue the operation of the motors 94 and 95. The hygrostat control 102 and the humidifying spray equipment 104 operate only in the winter time.

When the season switch 105 is thrown to the right as viewed in Figure 9, it will engage the open contact hereinbefore referred to so that when the circuits are energized by the effective temperature thermostat 96, one only of the motors will be caused to function, namely, that which operates the blower for circulating air through the heater unit and into the compartments 69. In this adjustment of the parts each time the hygrostat 102 demands moisture the humidifying spray 104 will be set into operation along with the air circulating equipment. The season switch 105 actuates the electric damper control 106 as well as the single air circulating blower for winter operation, both motors being operated simultaneously only when the switch is positioned for summer use as hereinbefore described. It should be understood that when the season switch is positioned toward the right, for winter use, the Y valve or damper control 106 will be actuated to direct the air through the heater to the exclusion of the by-pass previously referred to. During winter use a portion of the air fed into the compartment is recirculated and approximately 25% of make-up air is introduced from the outside for mixture with the recirculated air through the filtered inlet of the apparatus.

Should it be desired to augment the cooling capacity of the apparatus disclosed in detail in Figures 1 to 5 of the drawings, this can be accomplished by addition of an auxiliary cooling unit about to be described and in which ice or any form of artificial refrigeration may be employed to effect a further lowering of the temperature of air to be delivered to the compartments and to extract latent heat.

In Figures 10 to 13 of the drawings, I have illustrated an auxiliary unit in which melting ice is employed as the auxiliary cooling agent. In this modified illustration the main apparatus is identical with that disclosed in Figures 1 to 5 and is generally designated 114. Even the heater unit employed in the apparatus in Figures 1 to 5 may be employed in this modified apparatus, and in the modified illustration this unit is generally designated 115, but unlike the arrangement in Figures 1 to 5, in this modified equipment the delivery throat 116 from which the conditioned air is distributed above the heater unit leads into the auxiliary unit hereinbefore referred to and generally designated 117.

Figures 10, 12:
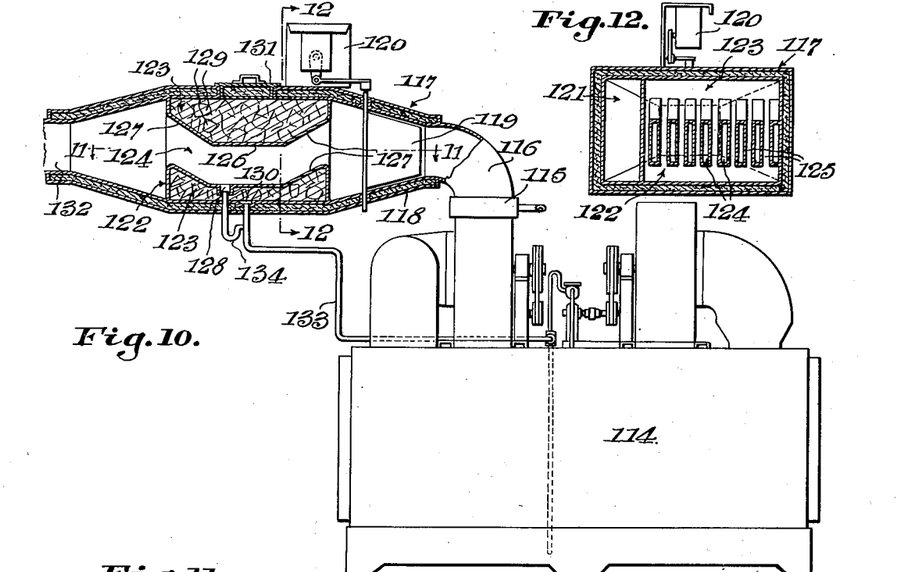
Figure 10 is a side elevation of an apparatus similar to that shown in Figure 1 with an auxiliary air conditioning unit connected in combination therewith and in which melting ice is employed to extract latent heat from air passing therethrough.
Figure 12 is a detail vertical cross section taken on the line 12—12 on Figure 10.

The auxiliary unit includes a Y entrance 118, and flow of air through the respective legs of the Y is controlled by a valve or damper 119 actuated by conventional mechanism contained in a control box 120 mounted on top of the unit as disclosed in Figures 10 and 12 of the drawings.

Figure 11:
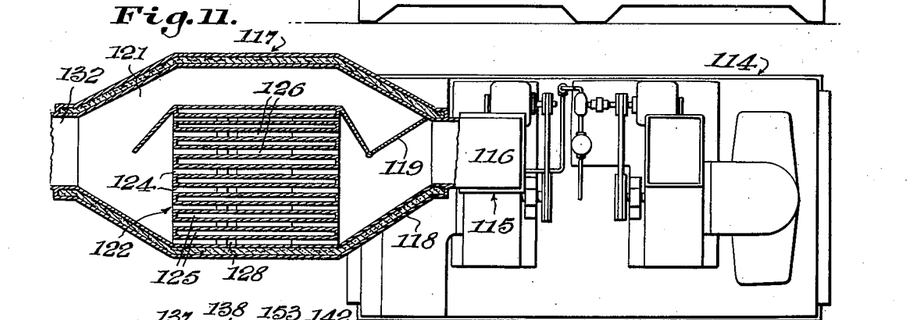
Figure 11 is a plan view of the apparatus of Figure 10, the auxiliary unit being shown in horizontal section on the line 11—11 on Figure 10.

One leg of the Y delivers into a by-pass 121, and the other leg delivers into a cooling unit generally designated 122 and which is disposed at the side of the by-pass as illustrated in Figure 11 of the drawings. The cooling unit is in the nature of a substantially cubicle chamber 123 adapted to contain ice fragments. Narrow ducts 124 generally similar to the air flow ducts 21 of the main apparatus are vertically disposed in laterally spaced relation in the cooling unit and the air to be additionally cooled passes through these ducts. The spacing of the ducts provides ice and water channels 125 intervening the ducts as shown in Figures 10, 11 and 12. The ducts 124 are shaped to provide a medial horizontal portion 126 and downwardly and upwardly inclined end portions or entrance or discharge portions 127 which cooperate with the horizontal portions to form a tortuous passage for the air.

The low portions or wells formed by the medial portion 126 of the ducts serve to collect water of condensation, and a suitable drain 128 is provided for draining off the collection of such water. As the ice 129 contained within the chamber 123 melts the water is permitted to drain off through a suitable drain 130. Ice can be supplied to the receiving chamber through a removable hatch 131. It will be observed by reference to Figure 11 of the drawings that the air discharging from the by-pass or the auxiliary cooling unit is delivered through a common outlet 132 into a common air delivery duct which delivers the air from the compartment or compartments to be conditioned. The ice water drain 130 is connected by a pipe line 133 with the inlet to the pump which supplies water to the atomizing spray heads within the main apparatus, and the drain 128 for water of condensation is connected by a line 134 with the line 133 as shown in Figure 10.

Figure 13:
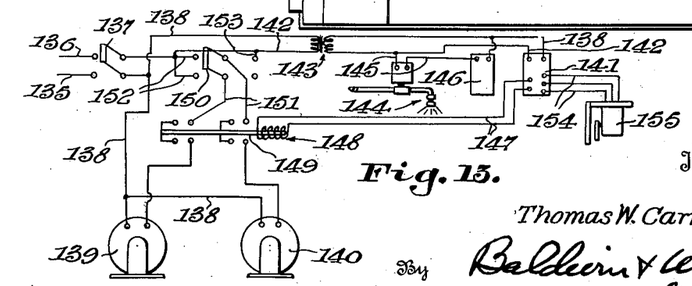
Figure 13 is a wiring diagram illustrating how the apparatus of Figures 10 to 12 can be controlled.

In Figure 13 of the drawings, I have illustrated a wiring diagram showing one control arrangement for the improved apparatus just described. The supply of power to the system from control lines 135 and 136 is controlled by a master hand switch 137. One line 135 is connected by lines 138 with one side of each of the motors 139 and 140 and with one side of an effective thermostat 141. The other line 136 is connected by lines 142 with the other side of the thermostat, a suitable transformer 143 being connected in the lines 138 and 142 respectively. The electric valve controlled humidifying spray which cooperates with the heating unit of the apparatus is diagrammatically indicated at 144 and is connected by lines 145 with the hygrostat or humidity control unit 146. The thermostat 141 is connected by lines 147 with a relay 148 which actuates a control switch 149 adapted to control the circuits selected by the double pole, double throw season switch 150. The center contacts of the season switch are connected by lines 151 with the other sides of the respective motors, circuits through these lines being completed or broken accordingly as the switch 149 is positioned under control of the thermostat 141.

The contacts at the left or summer side of the season switch are connected by lines 152 with the line 136. One of the contacts at the right or winter side of the season switch is an open contact and the other is connected by a line 153 with the lines 142 and 136. The thermostat 141 is connected by lines 154 with the Y valve control box 155 for controlling the position of said valve.

With the control equipment arranged as shown in Figure 13, the modified apparatus just above described will operate substantially the same as the apparatus disclosed in Figures 1 to 5. When the season switch is positioned to the left, or at the summer control position, both of the motors 139 and 140 will be actuated each time the thermostat 141 demands cooling of the compartments to be conditioned, and will be shut-off when the demand is met. When the season switch is positioned at the right, for winter control, one motor only will be set into operation when the thermostat 141 demands heat, namely, the blower which circulates air, it being undesirable at this time to operate the blower which supplies countercurrent air as an evaporative cooling medium or the atomizing spray heads. Unlike the control arrangement of Figure 6, this modified control arrangement includes the Y valve or damper control 155. This damper directs the flow of air from the main cooling unit through the ducts 124 of the auxiliary cooling unit for further lowering the temperature of and extracting latent heat from said air. At times this damper will be positioned by the thermostat 141 and the control equipment 155 so as to direct the air through the by-pass 121 direct to the area to be conditioned. Under normal operation, on hot summer days, the composite apparatus will operate continuously and the damper will be shifted occasionally from the position in which it directs air through the by-pass to a position for directing the flow of air through the coils surrounded by the ice for further lowering the temperature and extracting latent heat. Should a sudden lowering of temperature occur on the outside, from rain or other atmospheric changes, the effective temperature control would shut-off the system entirely. As is well known, the melting ice will constantly maintain a temperature of 32° and by directing the melting water through the pipe line 133 to be pumped through the atomizing sprays in the main apparatus, this water, sprayed into the main unit with water from the sump, and at a temperature of substantially 35°, will materially aid in effecting the cooling of air passing through the main unit.

The improved combination of the main cooling apparatus operating on the evaporative cooling principle and the auxiliary unit in which melting ice is employed to further cool and extract latent heat from the air previously cooled by the main unit, and the use of the cold water resulting from the melting of the ice in the atomizing sprays of the main unit, provides a simple and efficient cooling equipment which can be operated at a low cost. For instance, assuming it is desired to retain a room at 80° F. and with a relative humidity of 50%, with an outside temperature of 100° F. dry bulb and 75° F. wet bulb, by using ice only as a cooling medium for this service, and assuming a sensitble heat load of 10,000 B. t. u. per hour and the introduction of 243 C. F. M. of outside air per minute, this service would consume 94# of ice per hour or the equivalent in cooling produced by mechanical refrigeration or otherwise. Operating the same equipment in combination with ice and evaporative cooling, only 64½# of ice per hour would be required.

If desired dry ice or solid $CO_2$ can be employed in the chamber 123 instead of ice, and in this use the drain equipment 130 and 133 can be dispensed with and the drain pipe 134 connected directly with the sump at the bottom of the main apparatus.

In Figures 14 to 17 of the drawings, I have illustrated an equipment similar to that shown in Figures 10 to 13 and differing therefrom only in that a mechanical refrigerating unit is substituted for the melting ice cooling unit of the auxiliary equipment disclosed in said Figures 10 to 13. In this modified equipment the inlet 156 from the main apparatus delivers into a Y controlled by a valve or damper 157 in the same manner as previously described, one leg of the Y delivering into a by-pass 158 and the other into a cooling unit generally designated 159. In this illustration the cooling unit 159 embodies any conventional form of artificial refrigeration and in this particular illustration includes cooling coils 160 supplied with a refrigerant from the supply line 161 and which returns the refrigerant to the usual condenser through the return line 162, the usual cooling fins 163 being included in the cooling unit. As previously stated the mechanical refrigeration system may be of any conventional type and the flow and return lines 161 and 162 alone of the system are shown. A suitable drain 164 is provided for draining water of condensation and this line may be connected with the sump at the bottom of the main cooling unit such as is disclosed in detail in Figures 1 to 5 of the drawings. The by-pass 158 and the air passages through the mechanical refrigeration cooling unit deliver through a common outlet 165 toward the compartment or compartments to be conditioned.

Figures 14, 15, 16, 17:
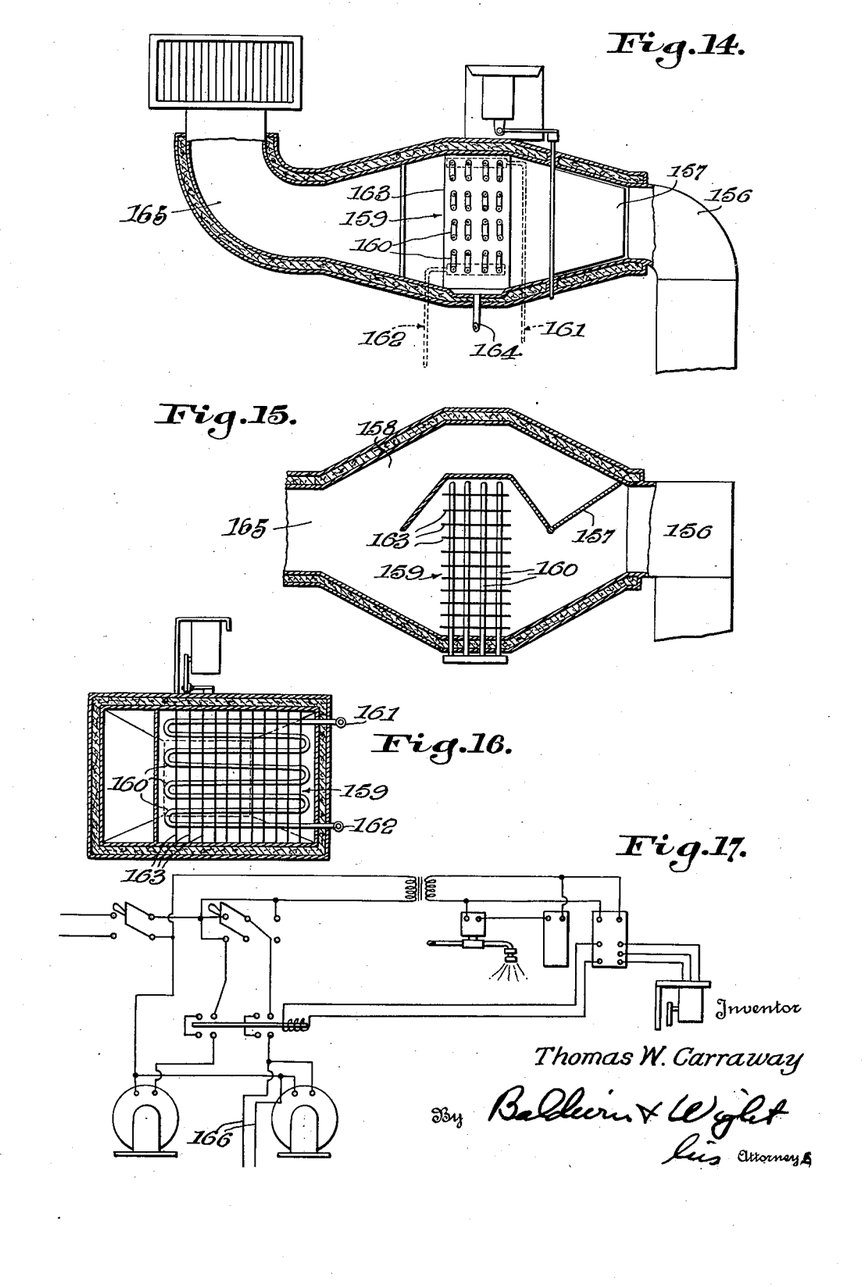

In Figure 17 of the drawings, there is illustrated a wiring diagram showing how this modified apparatus can be controlled and it will be noted that this diagram is identical with the diagram accompanying the apparatus of Figures 10 to 12 except that separate motor servicing power lines 166 are added so that a separate motor can be employed for operating the main unit spray pump instead of driving this pump from one of the motors mounted on top of the main unit and diagrammatically illustrated in Figure 17.

In numerous instances herein I have referred to bathing the external surfaces of the ducts carrying the air to be cooled with a very thin film of water. It is to be understood that the invention comprehends the use of water as an evaporative cooling spray, or any other liquid or liquid mixture having a suitable boiling point and volatility.

It is of course to be understood that the details of structure and arrangement of parts may be variously changed and modified without departing from the spirit and scope of my invention.

I claim:

1. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled.

2. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries shaped to provide tortuous passages for the air and a plurality of vertically disposed wells, and said bathing means including atomizing sprays disposed in the wells.

3. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries each including an inwardly bowed portion whereby to provide tortuous passages for the air and vertical side and end pairs of wells, and said bathing means including an atomizing spray equipment in each well.

4. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries shaped to provide tortuous passage for the air and a plurality of vertically disposed wells, and said bathing means including atomizing sprays disposed in the wells, said fans being supported on the casing with their axes disposed longitudinally of the casing; and pump means drive-coupled with the first mentioned fan and serving said sprays.

5. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries shaped to provide tortuous passages for the air and a plurality of vertically disposed wells, and said bathing means including atomizing sprays disposed in the wells, said fans being supported on the casing with their axes disposed longitudinally of the casing; and pump means drive-coupled with the first mentioned fan and serving said sprays; and means for automatically controlling operation of the fans individually or collectively.

6. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in to separate side batteries each including an inwardly bowed portion whereby to provide tortuous passages for the air and vertical side and end pairs of wells, and said bathing means including an atomizing spray equipment in each well; pump means drive-coupled with the first mentioned fan and serving said sprays; a conduit for delivering conditioned air from said second mentioned fan to an area to be cooled; an auxiliary cooling unit in said conduit and utilizing melting ice as a cooling medium; and means for delivering the ice water resulting from the melting of the ice to said pump means for delivery to said sprays.

7. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries each including an inwardly bowed portion whereby to provide tortuous passages for the air and vertical side and end pairs of wells, and said bathing means including an atomizing spray equipment in each well; a conduit for delivering conditioned air to an area to be cooled; and an auxiliary cooling unit in said conduit and utilizing melting ice as a cooling medium.

8. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries each including an inwardly bowed portion whereby to provide tortuous passages for the air and vertical side and end pairs of wells, and said bathing means including an atomizing spray equipment in each well; a conduit for delivering conditioned air to an area to be cooled; an ice bunker in said conduit; and laterally spaced narrow air ducts passing longitudinally through said bunker.

9. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross headers; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries each including an inwardly bowed portion whereby to provide tortuous passages for the air and vertical side and end pairs of wells, and said bathing means including an atomizing spray equipment in each well; a conduit for delivering conditioned air to an area to be cooled; an ice bunker in said conduit; and laterally spaced narrow air ducts passing longitudinally and tortuously through said bunker, and each including a condensation collecting depression.

10. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries each including an inwardly bowed portion whereby to provide tortuous passages for the air and vertical side and end pairs of wells, and said bathing means including an atomizing spray equipment in each well; a conduit for delivering conditioned air to an area to be cooled; an ice bunker in said conduit; and laterally spaced narrow air ducts passing longitudinally and tortuously through said bunker, and each including a condensation collecting depression; and means for delivering the ice water resulting from the melting of the ice and the collected condensation to said spray means.

11. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries each including an inwardly bowed portion whereby to provide tortuous passages for the air and vertical side and end pairs of wells, and said bathing means including an atomizing spray equipment in each well; a conduit for delivering conditioned air to an area to be cooled; and an auxiliary cooling unit in said conduit and utilizing melting ice as a cooling medium; a by-pass in said conduit about said cooling unit; and an automatically operable damper for controlling passage of air through said cooling unit or said by-pass.

12. An air conditioning unit of the evaporative cooler type comprising a hollow elongated casing open at its respective ends for ingress of air; a vertically disposed cross header connecting a pair of side headers at one end of the casing; a pair of side headers at the other end of the casing and joined above the casing by a horizontal cross header; a plurality of horizontally disposed vertically spaced narrow flat air conveying ducts communicating between the respective pairs of side headers; means for bathing the external surfaces of the ducts with a very thin film of liquid; a fan for drawing air into the casing between the horizontal header connected side headers, over the wetted duct surfaces, and upwardly out of the casing from between the vertical header connected side headers; and a fan for drawing air into the other end of the casing, and through the headers and ducts for delivery into a space to be cooled; said ducts being arranged in separate side batteries each including an inwardly bowed portion whereby to provide tortuous passages for the air and vertical side and end pairs of wells, and said bathing means including an atomizing spray equipment in each well; a conduit for delivering conditioned air to an area to be cooled; an ice bunker in said conduit; and laterally spaced narrow air ducts passing longitudinally and tortuously through said bunker, and each including a condensation collecting depression; means for delivering the ice water resulting from the melting of the ice and the collected condensation to said spray means; a by-pass in said conduit about said cooling unit; and an automatically operable damper for controlling passage of air through said cooling unit or said by-pass.

13. The combination of an evaporative cooler including ducts through which air is moved for distribution to an area to be air conditioned, spray means for wetting the external surfaces of the ducts with a very thin film of liquid, a fan for moving air through the ducts, a fan for moving air over and about the ducts, means for controlling operation of the fans individually or collectively, and a conduit through which air is delivered by the first mentioned fan to an area to be air conditioned, of an auxiliary cooling unit in said conduit and utilizing melting ice as a cooling medium, and means for delivering the ice water resulting from the melting of the ice to said spray means to augment the cooling effect thereof.

14. The combination of an evaporative cooler including ducts through which air is moved for distribution to an area to be air conditioned, spray means for wetting the external surfaces of the ducts with a very thin film of liquid, a fan for moving air through the ducts, a fan for moving air over and about the ducts, means for controlling operation of the fans individually or collectively, and a conduit through which air is delivered by the first mentioned fan to an area to be air conditioned, of an auxiliary cooling unit in said conduit and utilizing melting ice as a cooling medium, said unit including an ice bunker and laterally spaced narrow air ducts passing longitudinally through said bunker.

15. The combination of an evaporative cooler including ducts through which air is moved for distribution to an area to be air conditioned, spray means for wetting the external surfaces of the ducts with a very thin film of liquid, a fan for moving air through the ducts, a fan for moving air over and about the ducts, means for controlling operation of the fans individually or collectively, and a conduit through which air is delivered by the first mentioned fan to an area to be air conditioned, of an auxiliary cooling unit in said conduit and utilizing melting ice as a cooling medium, said unit including an ice bunker and laterally spaced narrow air ducts passing longitudinally and tortuously through said bunker and each including a condensation collecting depression.

16. The combination of an evaporative cooler including ducts through which air is moved for distribution to an area to be air conditioned, spray means for wetting the external surfaces of the ducts with a very thin film of liquid, a fan for moving air through the ducts, a fan for moving air over and about the ducts, means for controlling operation of the fans individually or collectively, and a conduit through which air is delivered by the first mentioned fan to an area to be air conditioned, of an auxiliary cooling unit in said conduit and utilizing melting ice as a cooling medium, said unit including an ice bunker and laterally spaced narrow air ducts passing longitudinally and tortuously through said bunker and each including a condensation collecting depression, and means for delivering the ice water resulting from the melting of the ice and the collected condensation to said spray means to augment the cooling effect thereof.

17. The combination of an evaporative cooler including ducts through which air is moved for distribution to an area to be air conditioned, spray means for wetting the external surfaces of the ducts with a very thin film of liquid, a fan for moving air through the ducts, a fan for moving air over and about the ducts, means for controlling operation of the fans individually or collectively, and a conduit through which air is delivered by the first mentioned fan to an area to be air conditioned, of an auxiliary cooling unit in said conduit and utilizing melting ice as a cooling medium, a by-pass in said conduit about said cooling unit, and an automatically operable damper for controlling passage of air through said cooling unit or said by-pass.

18. The combination of an evaporative cooler including ducts through which air is moved for distribution to an area to be air conditioned, spray means for wetting the external surfaces of the ducts with a very thin film of liquid, a fan for moving air through the ducts, a fan for moving air over and about the ducts, means for controlling operation of the fans individually or collectively, and a conduit through which air is delivered by the first mentioned fan to an area to be air conditioned, of an auxiliary cooling unit in said conduit and utilizing melting ice as a cooling medium, said unit including an ice bunker and laterally spaced narrow air ducts passing longitudinally and tortuously through said bunker and each including a condensation collecting depression, means for delivering the ice water resulting from the melting ice and the collected condensation to said spray means to augment the cooling effect thereof, a by-pass in said conduit about said cooling unit, and an automatically operable damper for controlling passage of air through said cooling unit or said by-pass.

19. In a cooling apparatus, an air conduit, a cooling unit in the conduit, laterally spaced narrow air ducts passing longitudinally through said unit, a by-pass in said conduit about said cooling unit, a Y connection, said air conduit and said by-pass terminating at their entrance ends respectively in the legs of said Y connection, and a damper in said Y connection for selectively directing passage of air through the legs of said Y connection and through said air conduit or said by-pass.

20. In a cooling apparatus, an air conduit, a cooling unit in the conduit, and laterally spaced narrow air ducts passing longitudinally and tortuously through said unit and each including a condensation-collecting depression, a by-pass in said conduit about said unit, a Y connection, said air conduit and said by-pass terminating at the entrance ends of each respectively in the legs of said Y connection, and an automatically operable damper in said Y connection for selectively directing passage of air through the legs of said Y connection and through said air conduit or said by-pass.

THOMAS W. CARRAWAY.